US008151339B2

(12) United States Patent
Ramachandran et al.

(10) Patent No.: US 8,151,339 B2
(45) Date of Patent: Apr. 3, 2012

(54) METHOD AND APPARATUS FOR IMPLEMENTING FILTER RULES IN A NETWORK ELEMENT

(75) Inventors: Vikram Ramachandran, Tyngsboro, MA (US); Alexandros Moisiadis, Stow, MA (US); Mohnish Anumala, Littleton, MA (US); Debin Zhang, Littleton, MA (US); Hong-Zhou Li, West Roxbury, MA (US)

(73) Assignee: Avaya, Inc., Basking Ridge, NJ (US)

( * ) Notice: Subject to any disclaimer, the term of this patent is extended or adjusted under 35 U.S.C. 154(b) by 1849 days.

(21) Appl. No.: 11/316,720

(22) Filed: Dec. 23, 2005

(65) Prior Publication Data

US 2007/0150614 A1 Jun. 28, 2007

(51) Int. Cl.
*G06F 17/00* (2006.01)
*H04L 29/06* (2006.01)
*G06F 15/177* (2006.01)
*G06F 15/173* (2006.01)

(52) U.S. Cl. ............ 726/13; 726/2; 726/3; 726/4; 726/6; 726/11; 726/12; 726/14; 726/15; 713/151; 713/152; 713/154; 713/165; 713/185; 709/220; 709/223

(58) Field of Classification Search ................. 726/1, 13; 713/154; 709/220, 223
See application file for complete search history.

(56) References Cited

U.S. PATENT DOCUMENTS

| | | | |
|---|---|---|---|
| 6,233,574 B1* | 5/2001 | Ladwig et al. ............ | 707/4 |
| 6,651,096 B1* | 11/2003 | Gai et al. ............ | 709/223 |
| 6,772,223 B1* | 8/2004 | Corl et al. ............ | 709/238 |
| 7,023,853 B1* | 4/2006 | Bechtolsheim et al. ...... | 370/392 |
| 7,133,914 B1* | 11/2006 | Holbrook ............ | 709/224 |
| 7,370,344 B2* | 5/2008 | Boozer et al. ............ | 726/2 |
| 7,792,113 B1* | 9/2010 | Foschiano et al. ............ | 370/392 |
| 2002/0032871 A1* | 3/2002 | Malan et al. ............ | 713/201 |
| 2002/0133586 A1* | 9/2002 | Shanklin et al. ............ | 709/224 |
| 2004/0205355 A1* | 10/2004 | Boozer et al. ............ | 713/200 |
| 2005/0018668 A1* | 1/2005 | Cheriton ............ | 370/389 |
| 2005/0190758 A1* | 9/2005 | Gai et al. ............ | 370/389 |

(Continued)

OTHER PUBLICATIONS

F. Estrada, *CSC228H—File Structures and Data Management*, (18 pages).

*Primary Examiner* — Edan Orgad
*Assistant Examiner* — Jenise Jackson
(74) *Attorney, Agent, or Firm* — Anderson Gorecki & Manaras LLP

(57) ABSTRACT

Multiple non-conflicting actions associated with filter rules may be located and applied to a packet using a single ACL lookup by causing action records to be created from ACEs in the ACL, and then causing the ACL lookup to return the action record rather than any one particular ACE. Radix tables may be created to enable a search engine to quickly locate the appropriate action record based on a particular set of attributes associated with the incoming packet. The action record can contain multiple actions taken from multiple ACEs that apply to the particular packet. By grouping all the actions into an action record, and then searching for an action record that applies to the packet, it is possible to apply all non-conflicting actions to the packet regardless of the number of ACEs that are used to specify those actions. Since all the actions are located together, the actions of all ACEs may be applied to a packet using a single ACL lookup.

17 Claims, 3 Drawing Sheets

U.S. PATENT DOCUMENTS

| | | | |
|---|---|---|---|
| 2005/0220092 A1* | 10/2005 | LaVigne et al. | 370/389 |
| 2006/0072456 A1* | 4/2006 | Chari et al. | 370/230 |
| 2006/0083167 A1* | 4/2006 | Balakrishnan | 370/230 |
| 2006/0224590 A1* | 10/2006 | Boozer et al. | 707/9 |
| 2006/0224897 A1* | 10/2006 | Kikuchi et al. | 713/182 |

* cited by examiner

METHOD AND APPARATUS FOR IMPLEMENTING FILTER RULES IN A NETWORK ELEMENT

BACKGROUND

1. Field

This application relates to network elements and, more particularly, to a method and apparatus for implementing filter rules in a network element.

2. Description of the Related Art

Data communication networks may include many switches, routers, and other devices coupled to and configured to pass data to one another. These devices will be referred to herein as "network elements." Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

FIG. 1 illustrates one example of a communication network 10. As illustrated in FIG. 1, customer equipment 12 enables subscribers to access the network 10 by interfacing with one or more Provider Edge (PE) network elements 14. The provider edge network elements collect traffic from multiple subscribers and multiplex the traffic onto the network backbone, which includes multiple Provider (P) network elements 16 connected together. The subscribers thus may obtain access to the network 10 to exchange data with other subscribers, to obtain access to networked resources, or otherwise to take advantage of the communication services provided by the communication network.

The network elements on the communication network, such as customer equipment 12, provider edge network elements 14, and provider network elements 16, communicate with each other using predefined sets of rules, referred to herein as protocols. Multiple protocols exist, and are used to define aspects of how the communication network should behave, such as how the network elements should identify each other on the network, the format that the data should take in transit, and how the information should be reconstructed once it reaches its final destination. Examples of several protocols include Asynchronous Transfer Mode (ATM), Frame Relay (FR), Ethernet, Transport Control Protocol (TCP), Internet Protocol (IP), Point-to-Point Protocol (PPP), and Multi-Protocol Label Switching (MPLS), although there are probably more than 100 other protocols as well that may be used to govern aspects of communications taking place over the network.

The network 10 may be shared by many subscribers. To enable the network elements to identify packets associated with particular subscribers or that require special attention, filter rules may be specified indicating that particular actions should be taken on packets with particular attributes. The filtering rules allow the network administrator to specify how the packets should be identified and to specify a particular action to be taken on packets matching the attributes specified in the filter rules. For example, priority, quality of service, blocking, and other actions all use filters to identify packets for special treatment by the network elements.

Different filter rules may need to be applied to different interfaces that have been created on each network element. Interfaces may be physical, such as related to particular ports, or may be logical and span multiple ports. An example of a logical interface that may not be permanently associated with a particular physical port is a Virtual Local Area Network (VLAN), in which traffic for the VLAN may arrive at the network element over more than one port. To enable different filter rules to be applied to different flows of traffic, an Access Control List (ACL) is created for each port or VLAN on which filtering is to be implemented. The Access Control List contains a group of filter definitions referred to herein as Access Control Entries (ACE). The ACEs may be created using an Access Control Template (ACT) that is associated with the ACL. The ACT defines the format of the ACEs, such as which fields may be used to specify particular attributes, the order of the fields, and the format of the fields. All ACEs in a given ACL are created using the same ACT so that all of the ACEs in the ACL are formatted in a common manner. Different ACTs may be used for different ACLs on the same network element, however.

Filter rules (ACEs) may be defined by the network administrator or may be defined by programs running on the network element. Accordingly, there may be multiple ACEs within an ACL that all specify different actions to be performed on a particular group of packets having particular attributes.

Conventionally, only one ACE from a given ACL would be located and applied to a packet when the packet was received at the network element. For example, when a packet was received, the ACL for the port/VLAN on which the packet was received would be searched to determine if the packet matched an ACE within the ACL. If so, the first ACE to be located was applied and the action associated with that ACE would be applied to the packet.

Recognizing that more than one ACE within an ACL may apply to a given packet, a system was developed that enabled multiple ACEs to be retrieved sequentially from a given ACL. Specifically, using this sequential retrieval process, when a packet was received, the appropriate ACL for that packet would be searched to locate a first ACE. That ACE was then removed from the ACL and the ACL would be searched a second time. If a second matching ACE was located, the second ACE would be removed from the ACL and the process would iterate until a desired number of ACEs were identified. A prioritizing process was then used to identify which of the actions from the located ACEs should be applied to the packet.

While this solution may enable multiple ACEs to be identified and applied to a given packet, it requires multiple searches to be performed within the ACL. This increases the processing time associated with performing a filter search for each packet, which is undesirable when the network element is required to have very fast throughput. Additionally, since the process requires multiple searches to be performed, there is a practical limit to the number of ACEs that may be identified using this process. For example, the network element may not have sufficient time to perform more than around five search sequences for a given packet so that only up to five ACEs may be identified for a given packet. Thus, potentially other ACEs also relevant to the packet may be not located and thus not applied by this process. Accordingly, it would be advantageous to provide another method and apparatus for determining which ACE actions should be applied to a given packet.

SUMMARY OF THE DISCLOSURE

A method and apparatus for implementing filter rules in a network element enables the actions of multiple non-conflicting ACEs to be ascertained using a single ACL search, for example by causing an ACL lookup to return an action record containing multiple actions for the given packet. According to an embodiment of the invention, action records are created from ACEs, and lookup tables such as Radix tables, hash-based lookup tables, binary search trees, linked lists, or other forms of fast lookup tables, are created to enable a search engine to quickly locate the appropriate action record based on a particular set of attributes associated with the incoming packet. By creating the lookup tables before-hand and pushing the lookup tables to the network processor, the network processor can efficiently perform a search to locate an action record for the packet. Additionally, the lookup tables may be updated with new action records as new ACEs are added, deleted, or modified, without requiring the entire ACL tables to be replaced. The action record can contain multiple actions taken from multiple ACEs that apply to packets with a particular set of attribute values. By grouping all the actions into an action record, and then searching for an action record that applies to the packet rather than searching for the ACEs that apply to the packet, it is possible to apply all non-conflicting actions defined by the multiple ACEs regardless of the number of ACEs that were used to specify those actions.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 2:
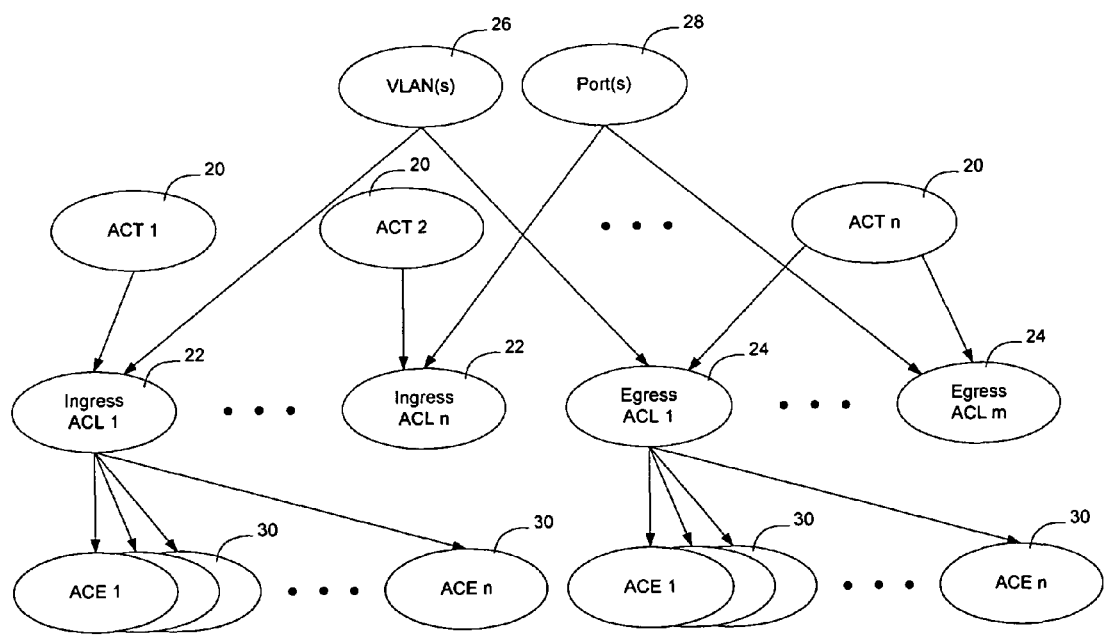
FIG. 2 is a diagram illustrating the structure of access control lists and access control entities that may be used in connection with an embodiment of the invention.

FIG. 2 illustrates a diagram of how Access Control Templates (ACTs) may be used to control creation of Access Control Entries (ACEs) associated with Access Control Lists (ACLs). The invention is not limited to this particular way of implementing ACLs and ACEs, as many other ways of defining filter rules and lists of filter rules may be used as well. For example, it may be possible to use ACLs containing ACEs created without reference to an ACT. There are many ways of creating ACEs and ACLs, and the invention is not limited to a particular manner in which the ACLs and ACEs are created.

In the example shown in FIG. 2, ACTs 20 may be used to create ingress ACLs 22 and egress ACLs 24. Ingress ACLs are ACLs associated with a port or VLAN over which a packet is received, while egress ACLs are ACLs that are associated with a port or VLAN over which a packet is to be transmitted. Depending on the type of packet, it may make sense to filter on the egress rather than the ingress since particular types of packets experience high drop rates and, thus, filtering of those packets may be avoided by causing the filter rules to be applied at egress rather than at ingress. Filtering at ingress and egress is well known in the networking field and the invention is not limited to any particular ways of using the filters once defined, as discussed in greater detail herein. An ACL may be associated with a logical interface such as a VLAN 26 that may span multiple physical ports, or may be associated with a particular physical port 28. The invention is not limited by the particular manner in which the ACLs are associated with particular physical and logical entities on a network element.

An ACT 20 may be used to define the format used by ACEs 30 within a particular ACL 22, so that the attributes of all ACEs in a given ACL may be commonly searched by looking at particular fields. Specifically, the ACT will specify the attributes that may be specified in the ACEs, the order of the fields that will contain the attributes, and the format of the fields.

A VLAN or a port can be associated with one or more Ingress ACLs and one or more egress ACLs. Additionally, a given network element may include both VLAN-based and port-based ACLs. Accordingly, a network element may need to apply two or more ACLs to a particular packet. For example, a packet on VLAN-1 received on port 23 may be required to be filtered against rules in the ACL for VLAN-1 as well as the ACL for port 23. Where there is a conflict between the ACEs in the VLAN and port based ACLs, a decision may be made as to which ACL should take precedence. This decision may be made according to policy, such as by automatically giving the port ACL precedence. The invention is not limited in the manner in which this conflict is resolved.

A default action is applied when a packet does not match any ACEs in the associated ACL for that port or the ACL for the VLAN. For example, the default action may be set to "permit," so that the packets that don't match filtering rules to be forwarded normally by the network element. Alternatively, the default action may be set to "drop" so that all packets that don't match at least one ACE within the ACL will be dropped by the network element. Other default actions may be used as well.

Attribute values in an ACE may be specified using operators such as equal-to, not-equal-to, less-than-or-equal-to, or greater-than-or-equal-to. If the equal-to and not-equal-to operators are used, the user can specify a list and/or a range of values. A single value has to be specified for the other 2 operators. Special operators such as match-any, match-all, prefix-list, and any, also may be used, depending on the particular attribute being specified by the ACE. If L3 and L4 attributes are configured, ACEs may be applied to the non-fragments and the initial fragment of an IP packet.

The following attributes may be specified in an ACE. Although this list provides several types of attributes, the invention is not limited in this manner as other attributes may be used as well.

ARP operation—If the packet is an ARP packet, then this attribute is used to match on the ARP operation (ARP request or ARP response). Since a packet will either be an ARP operation or not, the only operator supported for this attribute is "equal to".

Ether-type—ether-type names and numbers may be specified, and other protocols that may be encapsulated may also be specified as well. For example several encapsulation types that may be specified include ipx802 dot3, ipx802 dot2, ipxSnap, ipxEthernet2, appleTalk, decLat, decOther, sna802 dot2, snaEthernet2, even though these encapsulation types are not considered ether-types. Other types may be specified as well depending on the particular protocols supported by the network element and the invention is not limited to these particular Ethertype values.

Source and Destination MAC addresses.

Port—A list of ports can be specified for VLAN based ACLs.

VLAN-Id—A list of VLANs can be specified for port based ACLs.

VLAN-tag-priority.

Source and Destination IP Address—a prefix-list operator has to be used if the user needs to use the configured prefix-list names as values for these attributes.

IP-frag-flag.

IP-options—the attribute may look at the IP header to see if the packet has IP options or not, and optionally also may look into determine whether specific options are present in the packet.

IP-protocol-type.

DSCP (Differentiated Services Code Point)—PHB (Per-Hop Behavior) names and DSCP values are supported.

TCP and UDP source/destination ports.

TCP-flags—The operators that can be specified when using this attribute are "match-any" and "match-all". If a list of flags are specified as values, then all the flags have to be set in the packet if the "match-any" operator is used. If not, the ACE will match if any of the flags specified as values are set.

ICMP-msg-type.

IPV6 parameters.

MPLS parameters.

Other user-defined attributes may be specified as well, and the invention is not limited to an embodiment that implements this list of available attributes or only these particular attributes.

ACEs each include one or more actions. There are 2 modes for an action. Permit and Deny. Table I shows which actions are valid for ingress and egress ACLs, with different modes of action. Other actions may be used as well and the invention is not limited to an embodiment that uses these particular actions or enables all of these particular actions.

TABLE I

| ACL | Action-mode | Valid Actions |
| --- | --- | --- |
| Ingress | Permit | Remark-dscp, remark-dot1p, mlt-index, police, eqress-queue, redirect-next-hop, next-hop-unreachable, stop-on-match Debug Actions: count, mirror, copy-to-primary-cp, copy-to-secondary-cp |
| Ingress | Deny | Debug Actions: count, mirror |
| Egress | Permit | Remark-dscp, remark-dot1p, stop-on-match Debug Actions: count, mirror |
| Egress | Deny | Debug Actions: count, mirror |

Figure 4:
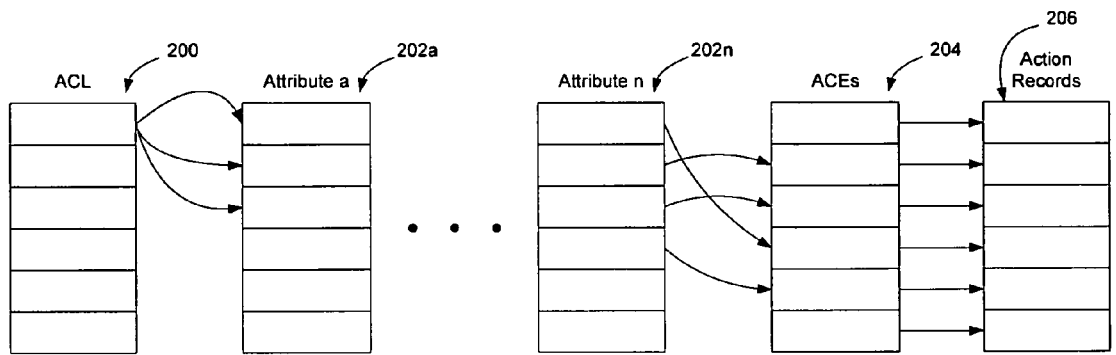
FIG. 4 is a diagram illustrating a data structure that may be used to sort ACEs to generate action records according to an embodiment of the invention.

As mentioned above, multiple ACEs may apply to a packet having particular attribute values, and each of the ACEs may specify one or more associated actions. Since, according to an embodiment of the invention, the non-conflicting actions of all ACEs will be stored in an action record to be applied to packets arriving at the network element, it is necessary to determine which actions should be afforded precedence in the event of a conflict between actions of two or more ACEs. FIG. 4, discussed below, illustrates one way in which lookup tables may be created to determine which ACEs apply to packets with particular attributes so that action records may be created for use by the fastpath.

Once the correct ACEs have been determined, according to an embodiment of the invention, the non-contradicting actions of all ACEs will be included in an action record to be applied according to their precedence. The precedence may be determined according to the ACE Id or in another manner. If a packet matches multiple ACEs in an ACL, the action(s) of the highest priority ACE will be applied. The actions of the remaining ACEs will also be applied only if they are of the same action-mode as the action mode of the highest priority ACE, and if the actions do not overlap with the highest priority ACE. Additionally, if a stop-on-match flag is specified, conflict resolution will stop at that point without considering the remaining ACEs with lower precedence value. If a packet is redirected because of a match with an ACE, then the regular packet processing is not done for the packet.

Several examples may help to illustrate application of these priority concepts. The invention is not limited by these examples as these examples have been provided merely to illustrate application of an aspect of an embodiment of the invention.

EXAMPLE 1

ACE 1—mode permit, actions—police
ACE 2—mode deny, actions—mirror

The actions of only ACE 1 will be applied in this example, because the actions of the two ACEs have different action modes.

EXAMPLE 2

ACE 1—mode deny, actions—mirror
ACE 2—mode permit, actions—police

The actions of only ACE 1 will be applied in this example, because the actions of the two ACEs have different action modes.

EXAMPLE 3

ACE 1—mode permit, actions—police
ACE 2—mode deny, actions—mirror
ACE 3—mode permit, actions—police, mirror
ACE 4—mode permit, actions—remark-dscp The actions of ACE 1 and ACE 4 will be applied in this example. The actions of ACE 2 is not applied in this example because it has a different action mode than ACE 1, and ACE 3 is not applied in this example because its action conflicts with the action specified in ACE 1.

EXAMPLE 4

ACE 1—mode permit, actions—police
ACE 2—mode deny, actions—mirror
ACE 3—mode permit, actions—mirror, stop-on-match
ACE 4—mode permit, actions—remark-dscp The actions of ACE 1 and ACE 3 will be applied in this example. The action of ACE 2 is not applied in this example because it has a different action mode than ACE 1, and ACE 4 is not applied because ACE 3 specifies stop-on-match, which prevents ACEs with lower precedence from being applied.

A user can configure both port based ACLs and VLAN based ACLs. Depending on the configuration, there may be instances where the actions of both port based ACLs and VLAN based ACLs have to be applied to a packet. In this case, a precedence determination based on policy may be used, such as to apply the port based ACL actions first, and then apply VLAN based ACL actions only if the action-mode is same as the action-mode of the action(s) determined from applying the port based ACL, and where the VLAN based ACL has ACEs with non-overlapping actions with the port based ACL actions. Other processes for determining precedence may be used depending on the particular implementation. Several examples may help to illustrate application of these priority concepts. The invention is not limited by these examples as these examples have been provided merely to illustrate application of an aspect of an embodiment of the invention.

EXAMPLE 5

Port ACL—mode permit, some actions
VLAN ACL—mode deny, some actions
In this example, the actions of Port ACL only will be applied because the action mode of the Port ACL ACEs are different than the action mode of the ACEs in the VLAN ACL. Since ACEs with different action modes may not be applied, and ACEs in the port ACL have precedence over the ACEs of the VLAN ACL, only the ACEs in the port ACL will be applied.

EXAMPLE 6

Port ACL:
ACE 1: mode permit, action—police
VLAN ACL:
ACE 1: mode permit, action—police
ACE 2: mode permit, action—remark-dscp
In this example, the actions of the port ACL and actions of ACE 2 of the VLAN ACL will be applied. In this example, the action modes of the ACEs are all the same. However, ACE 1 of the VLAN ACL is duplicative of ACE 1 of the port ACL. Accordingly, ACE 1 of the VLAN ACL will not be applied.

EXAMPLE 7

Port ACL:
ACE 1: mode permit, action—police
VLAN ACL:
ACE 1: mode permit, action—police, remark-dscp
In this example, the actions of the port ACL only will be applied and the action of ACE 1 of the VLAN ACL will not be applied. Specifically, the action of ACE 1 of the VLAN ACL conflicts with the action of ACE 1 of the port ACL. Since the port ACL takes precedence over the VLAN ACL, the action of ACE 1 of the VLAN ACL will not be applied.

Since Content Addressable Memory (CAM) used to implement common lookup engines is very expensive, as is memory in the network processing unit, it may be prudent to limit the number of ACEs that can be configured in a given network element, and also limit the number of ACE hits that can be counted. The invention is not limited to any particular levels as the particular number of ACEs and counters that may be configured on a network element will depend on the particular implementation.

Figure 1:
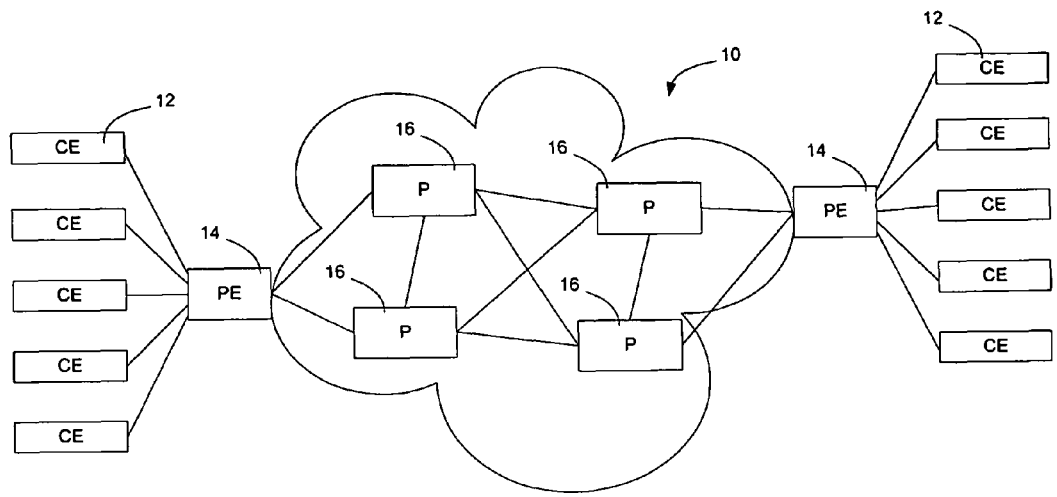
FIG. 1 is a functional block diagram of a communication network.
Figure 3:
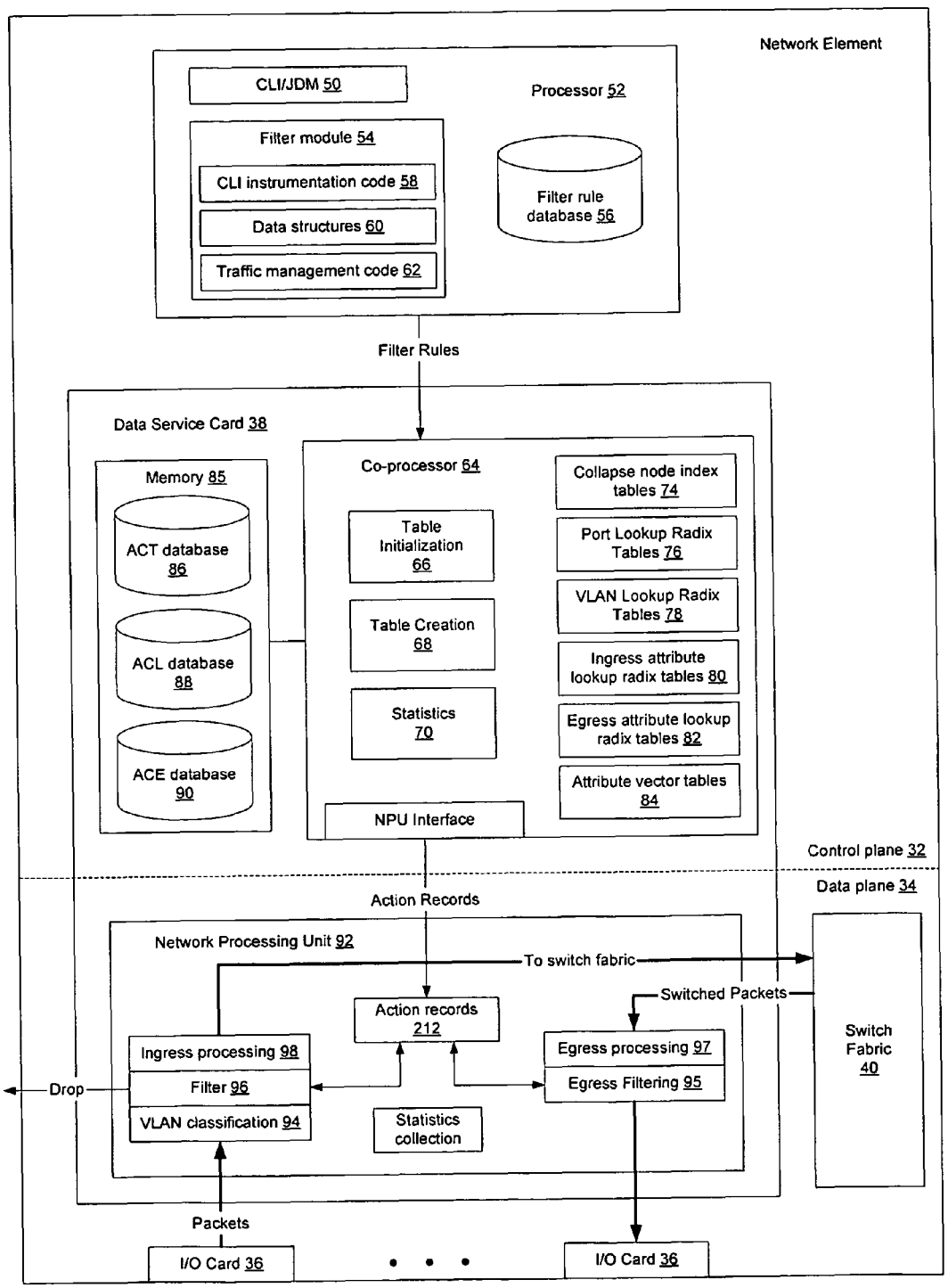
FIG. 3 is a functional block diagram of a network element that may be used to implement an embodiment of the invention.

FIG. 3 is a functional block diagram of an example of a network element according to an embodiment of the invention. Although a description of the structure and methods of operation of the embodiment illustrated in FIG. 3 will be provided herein to enable operation of the invention to be understood, the invention is not limited to this particular network element or a network element having a similar architecture, as the invention may be used in connection with network elements such as routers and switches formed using other alternative architectures. The embodiment shown in FIG. 3 may be used as customer equipment 12, a provider edge network element 14, a provider core network element 16, or as another type of network element, on a communication network such as the communication network 10 described above in connection with FIG. 1.

In the embodiment shown in FIG. 3, the network element generally includes a control plane 32 and a data plane 34. The control plane 32 is configured to control operation of the network element 20 by specifying how the data plane 34 should handle particular packets or classes of packets. The control plane generally includes one or more processors 52 configured to run programs to enable the network element to be controlled by a network administrator and to enable applications to be run on the network element.

The network element also includes a data plane 34 configured to handle packets of data on the communication network. The data plane 34 generally includes one or more Input/Output (I/O) cards 36, one or more data service cards 38, and a switch fabric 40. Packets received over the I/O cards 36 are passed to the data service cards 38, and then to the switch fabric 40. The switch fabric 40 enables a packet entering on a port on one or more I/O cards 22 to be output at a different port on the same I/O card or on a different I/O card in a conventional manner. A packet returning from the switch fabric 40 is received by one or more of the data service cards 38 and passed to one or more I/O cards 36. The packet may be handled by the same data service card 38 on both the ingress and egress paths or may be handled by different data service cards 38 on the ingress and egress paths. Although only one data service card is illustrated in the embodiment of FIG. 3, the invention is not limited in this manner because, in an actual implementation, it is likely that multiple data service cards may be provided to implement the data plane of the network element.

The I/O cards 36 are configured to connect to links in the communications network 10. The I/O cards 36 may include physical interfaces, such as optical ports, electrical ports, wireless ports, infrared ports, or ports configured to communicate with other physical media, as well as configurable logical elements capable of being programmed to implement interface definitions specified by an interface manager.

The data service cards 38 include one or more co-processors 64 configured to program filter information, e.g. filter tables, action records, and other information into the data plane. The data service cards in the illustrated example also contain one or more network processing units configured to enable the data service cards to perform packet processing on packets of data received from the I/O cards. The co-processor may be configured to program the network processing unit 92 to cause the network processing unit to handle packets in a desired manner. The path that packets take within the data plane will be referred to herein as the fastpath. The co-processor will program the components forming the fastpath to cause the fastpath to be able to implement the filter rules in the manner described in greater detail herein.

In the embodiment shown in FIG. 3, the components of the network element associated with creation and manipulation of filter rules have been shown in greater detail. The invention is not limited to the embodiment shown in FIG. 3, however, as other embodiments may be created to enable the action of multiple ACEs to be applied to a given packet without requiring multiple ACL access operations. Additionally, although particular components specific to the filter implementation have been shown, other common components of the network element have not been shown to avoid obfuscating the pertinent aspects of the invention. An actual implementation would include additional components and functional modules and the invention is therefore not limited to a network element having only the particular illustrated functional components.

In the embodiment shown in FIG. 3, filter rules are created by an user, such as a network administrator, via a Command Line Interface (CLI) or Java Device Manager (JDM). The CLI/JDM may be running on a control processor 52 in the control plane of the network element, or may be run on a remote computer or other network element, and the externally specified filter rules then may be passed to the processor on the network element. For simplicity of illustration, the CLI/JDM has been shown to be running on the processor on the network element. The invention is not limited in this manner as the CLI/JDM may be run on a different network element or processor without departing from the scope of the invention. Similarly, the invention is not limited to the particular network management interface used to enable filter rules to be entered into the network element, as any desired way of entering the filter rules may be used.

The rules are received by a filter module 54 running on the control processor 52. The filter module 54 is responsible for parsing the input from the CLI/JDM, performing consistency checks, and storing the filter rules in a filter rule database 56. The filter module 54 will also keep track of port and VLAN updates/changes. The filter module 54 contains all the CLI-instrumentation code 58, and also contains the data structures 60 to enable the processor to store information related to filters. It also contains the traffic management code 62 which enables traffic to be policed on the ingress and shaped at the egress. Traffic management is commonly performed to enforce service level agreements with particular customers by causing excess traffic to be dropped (policing) and to prevent the network element from transmitting too much data when the network is experiencing congestion (shaping).

Filter rules are passed to a co-processor 64 so that they may be programmed into the fastpath. The co-processor in the illustrated embodiment physically resides on the data service card configured to handle traffic on the network, and hence physically resides within the data plane. However, from a logical standpoint, because the co-processor works in connection with the processor to define how the data plane will handle traffic, the co-processor logically forms part of the control plane. The invention is not limited to implementation in a particular network architecture and, hence, is not limited to a particular way in which the co-processor is located within the network element. Additionally, the invention is not limited to the use of a separate co-processor as the functions performed by the co-processor may be implemented as one or more program modules running on the control processor 52.

In the illustrated embodiment, the co-processor has a table initialization module 66 that is responsible for initializing filter tables, databases, and data structures, and handling messages from the control processor related to filter configuration. The co-processor also has a table creation module 68 that is responsible for building search tables and creating the appropriate action records which the fastpath will use. The co-processor 64 also has a statistics module 70 responsible for harvesting filter statistics that may be sent to the control processor 52 on demand. Additional information about the particular tables created by the table creation module will be provided below. Once the co-processor has built action records for use by the NPU, the co-processor will program the NPU via an NPU interface to cause the action records and radix tables to be installed for use by the NPU to filter packets.

According to an embodiment of the invention, the filters may be stored in radix tables with collapsed nodes, as discussed in greater detail below in connection with FIG. 4. Other types of data structures may be used to implement the lookup tables and the invention is not limited to an embodiment that uses radix tables. Radix tables may be preferred, however, in certain instances since radix tables may enable the filters to be organized to use less memory in the NPU where the filter rules utilize wildcard entries. If there are a lot of wildcard attributes in an ACE, the memory utilization in the NPU may expand exponentially where other types of data structures are used to implement the lookup tables. To reduce the amount of memory to implement filter rules of this nature, radix tables with collapse nodes may be used. The collapse nodes provide a way to bring together valid ACEs for a particular attribute within an ACL.

The co-processor allocates and initializes ingress and egress collapse nodes index tables 72 for both port and VLAN based ACLs, which enable the search engine to understand the index structure of the radix tables. It also creates the port lookup radix tables 76 and VLAN lookup radix tables 78. These are the tables that tell the fastpath which ACL is configured on a particular port or VLAN.

The co-processor also creates ingress attribute lookup radix tables 80 and egress attribute lookup radix tables 82. These tables are the search tables for the attributes within an ACE. The co-processor also creates and populates attribute vector tables 84. With the help of these tables, the fastpath does not need to know which attributes are configured in an ACT. Rather, based on the vector of attributes contained in the attribute vector tables 84, the fastpath will know which attribute should be read in order to continue a lookup for a particular packet.

The radix table structure of FIG. 4 may be used to implement the tables discussed above in connection with FIG. 3. In particular, when a packet is received, the NPU will perform a port or VLAN lookup in the port lookup radix table 76 or the VLAN lookup radix table 78 to determine which port/VLAN the packet is associated with. The search engine will then perform a search on the ingress attribute lookup radix tables 80 or egress attribute lookup radix tables 82 depending on whether an ingress filtering operation is to be performed or an egress filtering operation is to be performed. The order in which attributes associated with the packet are used to index into the attribute lookup radix tables 80, 82 is defined by the attribute vector tables 84. By allowing the order in which the attributes are searched, the search strategy may be adjusted to allow particular attributes to be searched before other attributes, regardless of the structure of the ACT that was used to create the ACEs. The collapse node index tables 74 indicate the structure of the attribute lookup radix tables 78, 80, so that the search engine may efficiently determine which node should be searched for an attribute of a particular value or range of values.

When the attribute search has completed, and a positive match has been found, the attribute lookup radix tables 78, 80, will contain a pointer to an action record containing a list of actions to be applied. The action record is created, as discussed above, by combining the actions of all ACEs that apply to packets with particular attributes according to the precedence rules. The action record will be returned as a result of the search so that the set of actions may be applied to the packet.

The co-processor may maintain one or more databases, for example in memory 85, to store information received from the control processor. For example, the co-processor may maintain an ACT database 86 to allow the co-processor to store ACT information. Entries in the ACT database may be indexed by ACT ID or in another convenient manner. This database holds all information related to the ACTs, such as the attributes used by a particular ACT, pattern configuration information associated with the attribute(s), and other information associated with the ACT. ACT Creation/Deletion operations cause the ACT database 86 to be updated so that any changes to the ACTs may be used in connection with subsequent ACE definitions.

The co-processor may also contain an ACL database 88. ACL database is an array indexed by ACL ID that stores all the ACL specific information. The ACL database may be used to identify which port/VLAN is associated with a particular ACL and may contain a listing of the ACEs associated with that ACL.

An ACE database 90 may be used to store information about ACEs. ACE nodes are stored as sorted linear linked lists within the ACE database 90. Each ACE node has an array of attributes indexed by attribute ID. Each attribute link list node contains the attribute value/range as provided by the control processor. The ACT, ACL, and ACE databases are used to store information from the processor so that the co-processor may create the radix tables 74-84 and to update the radix tables as necessary.

Messages are used to send filter configuration information from the control processor 52 to the co-processor 64. Each of these messages may trigger an update to one or more of the databases kept on the co-processor as well as updates to the radix tables. For example, messages may be created to add or delete an ACT. A message of this type will cause the ACT database 86 on the co-processor to be updated and may cause changes to several of the other tables. Another message that may be used may cause an ACL to be added or deleted, or to replace the global actions of the ACL. The co-processor 64 will cause the ACL database 88 to be updated in response to a message of this type, and may also update one or more of the radix tables.

The processor 52 may also send a message to the co-processor 64 to cause an ACE to be added or deleted from the ACE database 90, or to replace an action of the ACE. When an ACE is added, deleted, or modified, a function is called to insert all the appropriate keys into the radix table. In this function, the key that is being inserted is broken from decimal boundary alignment to nibble boundary alignment because the NPU radix tables use radix-4 lookups, which require the nibble boundary alignment. The invention is not limited in this manner, as other implementations may require other actions to be taken to insert keys into the tables. The new vector entries being created in the radix tables will have a default value at this time.

Since the configuration of the network element may be changing, with ports and VLANs changing, an update VLAN/port message may be used to add or delete a member from the ACL. Receipt of this message will trigger an update to the Port and VLAN radix tables 76, 78 to indicate what ACL is being used on that particular Port or VLAN. There are separate messages to update the filter bit in the port and VLAN records. As mentioned above, other messages may be used as well and the invention is not limited to an embodiment that uses only these or all of these particular message types.

Filtering may be performed either at the ingress or egress side of the network element. At the ingress side, if either VLAN or port based filtering is configured, the fastpath 92 first performs VLAN classification 94 and then proceeds to perform filtering using the action records provided by the co-processor 64. If packets are not dropped because of an ingress filter, the fastpath will proceed to perform the desired ingress processing operations 99 such as a MAC lookup before sending the packets to the switch fabric 40. Since some of the packets will be dropped as a result of applying the filters, the filter process may be performed before other ingress processing so that ingress processing is not required to be performed for those packets that will ultimately be dropped anyway. The invention is not limited in this regard, however, as filters may be applied after the ingress processing operations. For example, ingress processing may cause policing to occur to cause packets to be dropped. Enabling filtering to occur after policing may result in a savings in processing resources. Thus, the invention is not limited to the particular order in which filtering and other processing operations are performed.

Some filter actions, such as egress queue ID filtering and multilink trunk (MLT) index filtering, filter packets based on packet destination information, which is not available until after regular packet processing is done. These filter actions will be applied by the fastpath once the regular packet processing is done. Unlike ingress filtering, egress filtering may take place at very late stage of packet processing. The reason for this is that some of the packets, even though they reach the egress, will be dropped due to the reasons like same segment discard, multicast mgid overload, etc. For example, the traffic management code 62 may apply shaping processes to cause some of the packets to be dropped so that the amount of traffic that is being transmitted from the network element may be adjusted. Since these packets will be dropped due to network conditions, filtering the packets just before the egress allows these packets to be dropped due to traffic management operations without requiring the egress filter functions to be performed on these packets that will ultimately be dropped anyway. Accordingly, as shown in FIG. 3, once a packet returns from the switch fabric (to the same or to a different data service card) egress processing 97 will be performed on the packets and then egress filtering 95 will be performed on the packets. The invention is not limited in this manner as egress filtering may alternatively be performed before traffic management.

The fastpath decides whether filtering should be performed for a particular packet at ingress or egress, using a VLAN or port ACL, based on bits in the following records.

ingress VLAN based filter: filter bit in VLAN record ingress port based filter: filt_or_ping_snoop bit in port record egress VLAN based filter: filter bit in VLAN control record egress port based filter: filter bit in port config record Once the filter bit is set in the port or VLAN record, the fastpath performs a lookup on the port or VLAN to get the ACL ID as well as the first lookup. The filter lookup code 96 takes the packet from one attribute to the next in an order specified in the attribute vector tables 84 to select an action record for the packet based on the attribute values associated with the packet.

For each filter attribute lookup, there are 3 possible results—lookup success, lookup fail, and go to next attribute lookup. If the lookup is a success, then this is a filter match and the corresponding filter action will be taken. If the lookup fails, that means the packet fits no filter. In this case, the default actions of the ACL are applied to the packet and the default ACL statistics are incremented. If the default action for the ACL is not "deny", the packet will go on to normal packet processing.

Each ACL may contain multiple ACEs, and each ACE has its own action. According to an embodiment of the invention, if a packet hits multiple ACEs, the co-processor 64 will "combine" all the action from these ACE's into one filter action record and the action record will be programmed into the fastpath so that a combined action may be applied by the NPU in connection with filtering packets. The following pseudocode is a definition of filter action record according to one embodiment of the invention. The invention is not limited to this particular filter action record definition, however, as other filter action definitions may be applied as well.

```
typedef struct
{
    union
    {
        struct
        {
            tUINT64 eQidOffset100:3;
            tUINT64 eQidOffset1G:6;
            tUINT64 eQidOffset10G:6;
            tUINT64 remarkDSCPValue:8;
            tUINT64 remarkQtagPriValue:3;
            tUINT64 police Account:9;
            tUINT64 mltIndexValue:3;
            tUINT64 redirUnreachAct:1;   /* 1: deny; 0: permit */
            tUINT64 remarkQos Value:3;    /* users can't set thru
                                             filt, changed by dscp
                                             or .1p,
                                             whichever has the
                                             higher priority */
            tUINT64 pad1:10;             /* pad bits should always be
                                             set to 0 */
            tUINT64 deny:1;              /* if not deny, must be permit,
                                             can't be none */
            tUINT64 count:1;
            tUINT64 mirror:1;
            tUINT64 cpCpu2nd:1;
            UINT64 cpCpuPrim:1;
            tUINT64 redirect:1;
            tUINT64 mltIndex:1;
            tUINT64 shape:1;
            tUINT64 remarkQtagPri:1;
            tUINT64 remarkDSCP:1;
            tUINT64 police:1;
            tUINT64 stopOnMatch:1;
        } bf;
        tUINT64 u64;
    } u;
} tFiltAction;
```

This action record defines the type of actions that will be applied to the packet. Also, it provides the complementary information needed by filter action, such as egress_queue_id, mlt_index_vlaue, etc. If it is not very necessary, the bits in this record should not be changed, because the current order gives the fastpath better performance. If it is necessary to change the order of the record, the corresponding code by using the NPU will also be required to be changed.

If both port based filter and a VLAN base filters are hit, the actions from each filter may conflict. In such case, the rule is not to apply partial action. For example, if the action from a port filter ACE is remark DSCP, another action from a VLAN filter ACE is remark DSCP and mirroring, then these two actions conflict and the VLAN filter action will be ignored. The valid action group is introduced to solve the action conflicting problem.

If both port and VLAN filters are hit, the VLAN action group will be looked at to apply the actions of the VLAN based filter. The code will go through each valid action group to take proper filter actions.

Filter statistics (byte and packet) may be counted in the NPU and collected, for example by the statistics module 70, to enable a network administrator to determine how many packets have been filtered.

Figure 5:
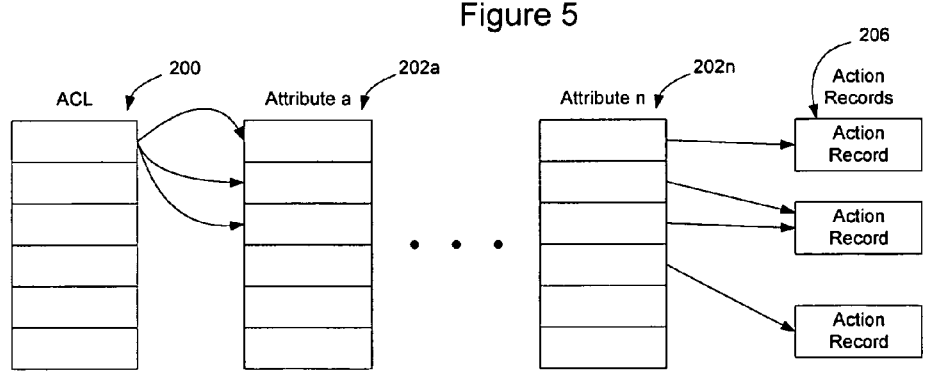
FIG. 5 is a diagram illustrating a data structure that may be used to locate an action record that should be applied to a packet having particular attribute values.

FIG. 4 illustrates an example of a set of lookup tables that may be used by the control plane to locate a set of ACEs that will then be used to generate action records for packets having particular attribute values. FIG. 5 shows an example set of lookup tables that may be used by the fastpath to locate the action records when a packet having particular attribute values arrives at the network elements. As is clear from a view of FIGS. 4 and 5, the tables are similar, except that the set of lookup tables used by the control plane to generate action records has an extra table containing the ACEs that apply to particular packets, whereas this extra table is not required by the fastpath since the fastpath will search for an action record, not for a set of ACEs.

In the embodiment illustrated in FIG. 4, the set of lookup tables starts with a first lookup table configured to enable the correct ACL to be determined for a particular packet. The first table 200 will be referred to herein as an ACL lookup table. The ACL lookup table 200 may be a radix 16 jump table or another type of lookup table. The entries in the lookup table are pointers to locations associated with particular ACLs. When a packet arrives, the ACL ID or other information will be used to key into the ACL lookup table 200 to determine which ACL(s) should be searched to find an action record for that particular packet.

For each ACL, one or more attribute lookup tables 202a-202n will be created. Each lookup table may be formed to enable a particular packet attribute value to be used as a key to further refine selection of particular ACEs that may apply to that particular packet. Several attributes lookup tables may be used depending on the number of ACEs within the ACL. The attribute lookup tables may be implemented as radix tables. For example, the attribute lookup tables may be collapsed nodes. Other types of lookup tables may be used as well.

Where the lookup tables are implemented as collapsed node radix tables, each collapse node will represent a set of ACEs within a particular ACL. For example, when a lookup is performed in the ACL lookup table, the result will be one or more ACLs. To search the ACL for ACEs matching particular attribute values, a first attribute lookup will be performed in a first collapse node having entries representing a first set of attribute values. If the result of the first attribute lookup is a subsequent attribute lookup, the subsequent attribute lookup will be performed in a collapse node radix table representing a subset of the ACEs that match the attribute values from the first attribute lookup. As subsequent attributes are searched, each subsequent search is performed on the result set of ACEs from the previous attribute lookup. The result set of ACEs may be the same set of ACEs used in the previous attribute lookup or may be a smaller subset of the ACEs that were searched in the previous attribute lookup. In this manner the search may cause an increasingly restricted set of set of ACEs to emerge, since subsequent searches are only performed on ACEs that were returned as potential matches to previously performed searches.

In the control plane, a result of organizing the lookup tables in this manner will cause a table of ACEs 204 to be generated, in which subsets of the ACEs will all apply to packets having particular attribute values. The control plane will take the actions associated with the ACEs 204 and generate action records 206. The action records will be liked to the action record tables so that, upon completion of a search through the attribute tables, the data plane will be able to determine the appropriate action records for packets having particular attribute values. The network element may then apply all of the actions in the action record to the packet so that, in effect, the network element is able to treat the packet in the same manner as if it had effectively located all ACEs within the ACLs that apply to that particular packet.

The attribute lookup tables may be implemented as collapsed nodes. The collapse node data structure is a well known radix construct that allows the node to contain a balanced set of values so that the node may be efficiently searched. Specifically, the collapsed node is organized so that each entry contains approximately the same range of values with the index table providing information as to the structure of the table so that the search engine may quickly index into the radix table. The collapse nodes in the illustrated may be radix-4 tables or tables having a different depth. Since the collapsed nodes enable ranges to be searched efficiently, wildcards and range values may be collapsed into fewer entries in the tables to enable the table to be kept relatively small and, hence, easier to implement and search. The invention is not limited to the use of radix tables with collapse nodes, as other data structures may be used to implement the lookup tables.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The logical entities described herein, may be embodied as one or more software programs implemented in control logic on a processor on the network element 20. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof.

Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network element, comprising:
   a microprocessor; and
   a computer readable memory containing program instructions for execution on the microprocessor, the program instructions including:
   first program logic configured to enable a set of ACEs in at least one ACL to be condensed to a set of action records, at least some of said action records containing multiple actions specified by different ACEs that commonly apply to packets having particular attribute values; and
   second programmable logic configured to enable the action records to be found in connection with performing filter operations on packets received by the network element to enable all actions specified by the action records to be applied to the packets;
   wherein each of the at least some of said action records containing a non-conflicting set of different actions associated with a plurality of filter rules that commonly apply to packets having the particular attribute values to enable all actions specified by the action records to be applied to the packets.

2. The network element of claim 1, wherein the action records are configured to contain actions from both port-based and VLAN based ACLs.

3. The network element of claim 1, wherein the actions contained in the action records are sorted according to precedence of an associated ACE.

4. The network element of claim 1, comprising:
   wherein the action records contain sets of non-conflicting actions derived from ACEs that apply to packets with the packets having the particular attribute values.

5. The network element of claim 1, wherein the first programmable logic is configured to sort the ACEs into lookup tables to determine the sets of ACEs, and wherein the second programmable logic is configured to enable the action records to be found in connection with performing filter operations by causing the lookup tables to be programmed into a fastpath of the network element to be used in connection with performing filter operations.

6. A method for implementing filter rules in a network element, the method comprising the steps of:
   processing, by the network element, a set of ACEs associated with an ACL to generate a set of action records, at least some of said action records containing a non-conflicting sets of different actions associated with pluralities of filter rules that commonly apply to packets having particular attribute values to enable all actions specified by the action records to be applied to the packets; and
   processing, by the network element, a set of ACEs associated with an ACL to generate a set of lookup tables for attributes specified in the ACEs, said lookup tables pointing to said action records, and being configured to enable a filtering operation to identify an action record based on attribute values of a packet so that all actions specified by the action records may be applied to the packets;
   wherein only non-conflicting actions are included in the lists.

7. The method of claim 6, wherein the step of processing the set of ACEs to generate a set of action records is implemented using radix tables.

8. The method of claim 7, further comprising the step of programming the radix tables and action records into a data path for use in connection with the filtering operation.

9. The method of claim 6, wherein the lookup tables are radix tables.

10. The method of claim 6, wherein the action records contain lists of actions to be applied to packets having particular attribute values, said lists of actions being derived from actions specified by the groups of ACEs for packets having particular attribute values.

11. The method of claim 10, wherein the actions in the lists are applied according to a precedence.

12. A method of applying a set of filters to a packet on a network element, the method comprising the steps of:

obtaining, by the network element, a packet having packet attribute values;

using, by the network element, a first of said packet attribute values as a key to a first search that is to be performed in a first attribute lookup table; and obtaining, by the network element, as a result of the first search, at least one of a lookup failure, a lookup success, and a next attribute indication, wherein when a lookup success is obtained, an action record associated with the lookup success is retrieved, said action record containing a non-conflicting set of different actions associated with a plurality of filter rules that commonly apply to packets having the packet attribute values to enable all actions specified by the action records to be applied to the packets.

13. The method of claim 12, wherein when the next attribute indication is obtained, the method further comprises the step of determining a subsequent packet attribute to be searched, obtaining a second packet attribute value associated with the attribute to be searched, and using the second packet attribute value as a key to a subsequent search that is to be performed in a subsequent attribute lookup table.

14. The method of claim 12, further comprising the step of obtaining as a subsequent result of the subsequent search, at least one of lookup failure, lookup success, and a second next attribute indication.

15. The method of claim 14, wherein the method further comprises the step of iterating the steps of determining a subsequent packet attribute and obtaining the subsequent result each time a second next attribute indication is obtained.

16. The method of claim 12, further comprising determining an ACL for the packet, and wherein the step of using the first packet attribute value is performed in a lookup table created from ACEs associated with the ACL.

17. The method of claim 12, wherein the lookup tables comprise radix tables.

* * * * *